P. Ulmer,
Bed Bottom.
Orig 25689
No. 929.
Reissued Mar. 13, 1860.
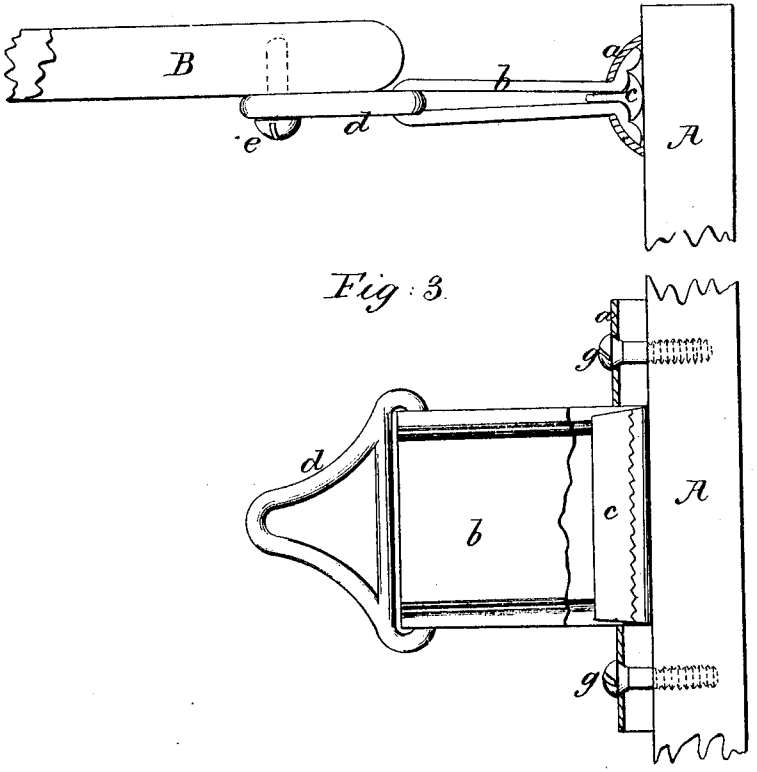
Fig. 2.
Fig. 3.
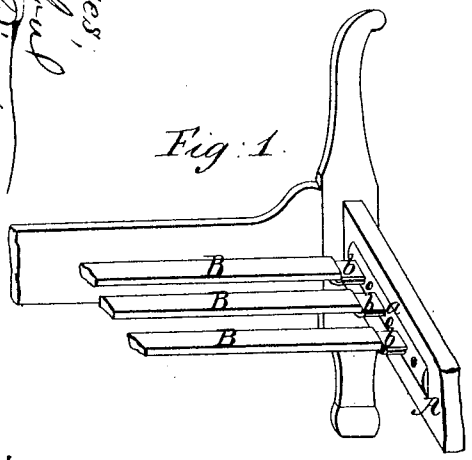
Fig. 1.
Witnesses;
N. Barlow
L. Pitkin
Inventor;
Philip Ulmer
N. PETERS, PHOTO-LITHOGRAPHER, WASHINGTON, D. C.

BEST AVAILABLE COPY

UNITED STATES PATENT OFFICE.

PHILIP ULMER, OF NEW YORK, N. Y.

IMPROVED SPRING BED-BOTTOM.

Specification forming part of Letters Patent No. 25,689, dated October 4, 1859; Reissue No. 929, dated March 13, 1860.

*To all whom it may concern:*

Be it known that I, PHILIP ULMER, of the city, county, and State of New York, have invented an Improved Spring Bed-Bottom; and I do hereby declare that the following is a full and exact description thereof, reference being had to the accompanying drawings.

The nature of this invention consists in an improved application or manner of attaching elastic webbing (or shirred fabric) to the rails and slats of a bedstead, forming a spring-bot-to n to the same.

Figure 1 is a partial view of a bedstead having this improvement applied thereto. Fig. 2 is a full-size end view of the spring H, partly in section. Fig. 3 is a top view, also partly in section.

A represents the end rail of a bedstead, to which the slats B B, &c., are attached by means of springs of webbing, as below explained. The slats are of the usual form and size.

At *b*, Figs. 1, 2, and 3, is shown the elastic webbing, which, being a well-known article of manufacture, needs no further description here.

*d* is a link of metal that fulfills the office of connecting the slat with the spring. It is thus connected to the slat by the screw *e*, the head of which serves as a hook. The link differs from those (of triangular shape) formerly used, by having its sides curved inward or contracted, so as to be nearly parallel for some distance from the end, (instead of straight, as before,) for the purpose that, when attached to the hook *e*, it may be drawn a half inch (more or less) before unhooking, or that it may not unhook itself by the sudden withdrawal of pressure from the spring, (as often occurs with those of the other form,) thereby obviating a serious difficulty, while at the same time it can be attached (or detached) sufficiently easy to the bedstead. The webbing passes through this line. Its two ends then joined, forming a loop, are secured by a fastening, as follows: *a* is a strip of metal an inch or more in width, having its outer surface convex and its inner corresponding concave, leaving a space between it and the rail, against the side of which it is screwed when in place. Its length may embrace the entire series of slats, or only that of one, as at Fig. 3. It has apertures or slots of the proper size to receive the webbing, the two united ends of which pass through it and are secured within its inner space. It is thus fastened by means of a wedge or tongue of metal, *c*, which has on either side of its head a projecting thin edge turned inward, (and serrated, if desired.) The two ends of the webbing being passed through the aperture, the tongue *c* is then driven in with some force between them, and the sharp projecting edges of its head are forced so as to indent the webbing or embed itself partially therein upon each side. It thus acts, first, as a wedge to force the webbing apart and into contact with the lips of the aperture; and, secondly, to bend the ends at a sudden angle and confine them in firm contact with the strip *a*. The webbing, thus held between compressing surfaces, cannot slip, thus rendering the parting of the connection impossible. It is also planned in thickness with reference to the several parts, that when the strip *a* is secured to the rail the tongue *c* bears on its back part against the wood of the rail, effectually preventing the attachment from becoming loose while the strip is so secured.

The strip *a* furnishes a ready means of at taching spring-bottoms of this and simil kinds to bedsteads. It has been common fore to have a separate frame-work ext around inside of the bedstead, to which springs, &c., are attached; but in this ca frame is dispensed with by the strip *a*, has only to be screwed to the rails plete the attachment to a bedstead. wise is exceedingly compact, proje slightly beyond the rail, and conc closes within itself the joints or e webbing. It is adapted in these other kinds and descriptions o than the above indicated, whe the above kind is used.

Different forms of compr will suggest themselves as r the fastening above, withou stantially the effect. The s modified by the use of a flat channeled space, or by a groove in the rail covered by a flat strip of either metal or wood.

Having thus described my invention, what I claim therein as new, and desire to secure by Letters Patent, is—

1. The method herein described of connecting the spring *b* (or any equivalent means) to the strip *a*, by which the same is secured in place by contact between compressing surfaces, substantially in the manner and for the purposes set forth.

2. The use and application of the strip *a*, substantially in the manner and for the purpose specified.

PHILIP ULMER.

Witnesses:
N. BARLOW,
L. PITKIN.